United States Patent [19]
Waczynski et al.

[11] Patent Number: 6,080,983
[45] Date of Patent: Jun. 27, 2000

[54] SYNCHRONOUS DETECTION SYSTEM FOR MULTICHANNEL INFRARED SPECTROSCOPY

[75] Inventors: Augustyn Waczynski, Indiana, Pa.; Mark L. Hendrickson, Lafayette, Colo.; David J. Hartwick, Hopewell, Pa.

[73] Assignee: Diasense, Inc., Pittsburgh, Pa.

[21] Appl. No.: 09/125,564

[22] PCT Filed: Feb. 21, 1997

[86] PCT No.: PCT/US97/02637

§ 371 Date: Dec. 21, 1998

§ 102(e) Date: Dec. 21, 1998

[87] PCT Pub. No.: WO97/31245

PCT Pub. Date: Aug. 28, 1997

Related U.S. Application Data

[60] Provisional application No. 60/012,140, Feb. 23, 1996, and provisional application No. 60/012,209, Feb. 23, 1996.

[51] Int. Cl.[7] .................................................... G01D 5/34
[52] U.S. Cl. ................................. 250/231.16; 250/208.2
[58] Field of Search ........................ 250/231.16, 231.13, 250/234, 237 R, 208.2, 214 R; 356/25, 375, 374, 300, 310, 304; 341/13; 359/241, 244, 245

[56] References Cited

U.S. PATENT DOCUMENTS

| | | |
|---|---|---|
| 3,707,329 | 12/1972 | Jaecklin et al. . |
| 4,616,210 | 10/1986 | Ferber et al. ............................ 340/347 |
| 4,808,822 | 2/1989 | Manning et al. ........................ 250/332 |
| 5,317,385 | 5/1994 | Silva et al. .......................... 250/231.16 |

*Primary Examiner*—Que T. Le
*Attorney, Agent, or Firm*—Webb Ziesenheim Logsdon Orkin & Hanson, P.C.

[57] ABSTRACT

Disclosed is a radiation detector which includes at least one photoconductive detector and a modulator, which modulates in an on-off manner radiation passing to the photoconductive detector from a radiation source. A bias source is connected to one terminal of the photoconductive detector. A first amplifier is connected to the other terminal of the photoconductive detector, and a second amplifier receives an output of the first amplifier. A first phase detector detects the phase of modulation of the radiation source by the modulator and generates a reference signal relating thereto. A switch in the second amplifier changes, in response to the reference signal generated by the first phase detector, the second amplifier between an inverting state and a non-inverting state as the modulator changes the phase of modulation of the radiation.

14 Claims, 3 Drawing Sheets

6,080,983

SYNCHRONOUS DETECTION SYSTEM FOR MULTICHANNEL INFRARED SPECTROSCOPY

This application claims benefit of Provisional Appl. 60/012,140, filed Feb. 23, 1996 and Provisional Appl. 60/012,209 filed Feb. 23, 1996.

BACKGROUND OF THE INVENTION

1. Field of the Invention

This invention relates to radiation detectors and, more particularly, to the synchronous detection of infrared radiation using a plurality of photoconductive detectors.

2. Background Art

The use of photoconductive detectors for measuring radiation is well known. Because of their high sensitivity, photoconductive detectors such as PbS and PbSe are particularly effective in measuring infrared radiation. Detection of infrared radiation is used by the military for tracking warm vehicles and in night vision devices, is used by medical instrument manufacturers for measuring glucose and other body constituents in a non-invasive manner and is used by scientific instrument manufacturers for measuring chemical composition and structure.

In general, the resistance of the photoconductive detector changes when the radiation falls on its surface. Resistance changes can be measured as an electrical signal change and the intensity of the detected radiation can be estimated by the magnitude of resistance change.

Photoconductive detectors typically require a bias current or voltage to operate, such as a direct current bias. The sensitivity of the detector is proportional to the magnitude of the applied bias. It is preferred to supply a high bias to such a detector to increase its sensitivity and to overcome the noise of the electronics associated with the detector in an overall detection system.

The bias voltage applied to a photoconductive detector also causes current to flow in the absence of incident radiation. This current, referred to as the "dark current" or "dark signal", is usually large when compared to the current changes resulting from incident radiation. The detection of the small, radiation related signal, which is added to the large, dark signal, is often difficult. In addition, this dark signal is often the source of most of the noise in a detection system.

Synchronous detection is frequently used to overcome the problems associated with the dark signal. The incident radiation is modulated at some frequency, which results in a radiation related signal generated by the photoconductive detector which is also a modulated signal. The desired radiation related signal can be separated from the DC dark signal with a DC blocking element such as a capacitor. The modulation frequency can be chosen in a region where the noise from the dark signal is low. The bandwidth of the detection system can be made narrow so that the fraction of the noise in this bandwidth is small. Synchronous detection provides additional filtering of the component of the noise that is at the modulation frequency but which is at the wrong phase.

A common narrow-band synchronous AC filter used for this purpose is the lock-in amplifier. In a typical lock-in amplifier, a capacitor is first used to separate the AC signal from the combined AC and DC signal. The separated AC signal is then rectified in synchronism with an external reference from the radiation modulation source. In its most basic form, the lock-in amplifier includes a DC blocking capacitor, an AC amplifier, an inverting AC amplifier, a multiplexer and an integrator. The multiplexer selects either the amplified signal or the amplified and inverted signal, depending on the value of the modulation related reference signal. The output of the multiplexer is a synchronously rectified DC signal that is supplied to the integrator.

When using a radiation detection system including a plurality of separate photoconductive detectors, each detector will require a separate circuit to capture the radiation related signal for that detector element. In such an application where it is desired to simultaneously process the signals of many photoconductive detectors, lock-in amplification has not been used. Such an arrangement would require too many separate components for each photoconductive detector and is too expensive to implement. As discussed above, for a lock-in amplification system, each photoconductive detector requires a blocking capacitor, two amplifiers, a multiplexer and an integrator. This is a large component requirement for a compact and efficient system. The method used in the past in such a system including a plurality of photoconductive detectors has been subtraction of the dark signal followed by amplification, integration and multiplexing of the integrated signal from several detectors to one output.

It is an object of the present invention to provide a synchronous detection system for use with a plurality of separate photoconductive elements, but in an arrangement which does not require a large number of elements for operation. It is also an object of the present invention to synchronize the signal collection aspects of the detection system with the operation of the radiation modulator.

SUMMARY OF THE INVENTION

In accordance with our invention, we replace the typical components of a lock-in amplifier, including the inverting amplifier, non-inverting amplifier and multiplexer, with a single amplifier and switch. Depending on the position of the switch, the amplifier feedback loop changes from an inverting to a non-inverting configuration. As a result, the input signal appears on the amplifier output with the same phase or with the phase changed 180° compared to the input. This is equivalent to multiplying the input signal by +1 or −1, depending on the phase. The switch action is controlled by a reference signal supplied by the modulator and in phase with the radiation modulation. The switch, combined with the amplifier and the control by the reference signal, performs the same function as two amplifiers and a multiplier would perform in a typical lock-in implementation.

In addition, our invention can improve the signal processing by supplementing a low pass filter action with a digital signal averaging process. An averaging algorithm introduces an additional filtering of the noise and higher signal harmonics or other interfering signals. This results in overall improved signal quality. In addition, we can improve overall performance in our invention by synchronizing all system components, including an analog-to-digital converter, chopper wheel rotational speed and analog signal processing. This results in attenuation of the unwanted signals resulting from interference and from system inaccuracies such as chopper jitter and noise.

The reference signal for controlling the switch in the amplifier is preferably derived from a phase detector, such as an optointerrupter, associated with the modulator, such as a chopper wheel. Separate phase detection in this manner, as compared to typical implementations where the reference signal is derived from the modulated signal itself, offers lower noise and is independent of the signal level. A controller for a chopper wheel motor is preferably referenced to a master clock, which also controls an analog-to-digital converter that digitizes the radiation related signals from the various photoconductive detectors. In this way, the overall operation of the system is synchronized to the data sampling and to the analog-to-digital conversion. This allows for implementation of an averaging algorithm which minimizes the chopper periodic noise and random jitter. The amplifier and switch section is preferably followed by a low pass filter which operates to limit signal bandwidth and to filter out higher frequency noise components. This filtering is supplemented by the digital averaging which is optimized to attenuate higher signal harmonics.

Preferably, the controller for the chopper wheel motor is based on an optical encoder associated with the chopper wheel. The motor control is based on a phase locked loop and employs a PID controller which performs signal proportional amplification, integration and differentiation. The motor controller uses a frequency generated by the master clock as a reference and maintains the frequency and phase of the chopper wheel at a constant level. In this way, the operation of the overall system is synchronized to the master clock and the actual radiation and sampling frequency.

The averaging algorithm used in one embodiment of our invention takes advantage of the synchronous data acquisition system described above. The averaging can be represented as a filter described in the frequency domain by the sync function. Maintaining a fixed integer number of samples per channel per given integer number of chopper wheel rotations results in filtering of all major signal harmonics. A whole number is preferably used to establish a relation between the rotation of the chopper wheel and the analog signal sampling rate. This allows positioning of the switch/amplifier frequency in such a way that interfering frequencies are removed away from the signal band. Only higher interfering harmonics can alias back into the signal, but their power is very low.

DESCRIPTION OF THE PREFERRED EMBODIMENTS

Figure 1:
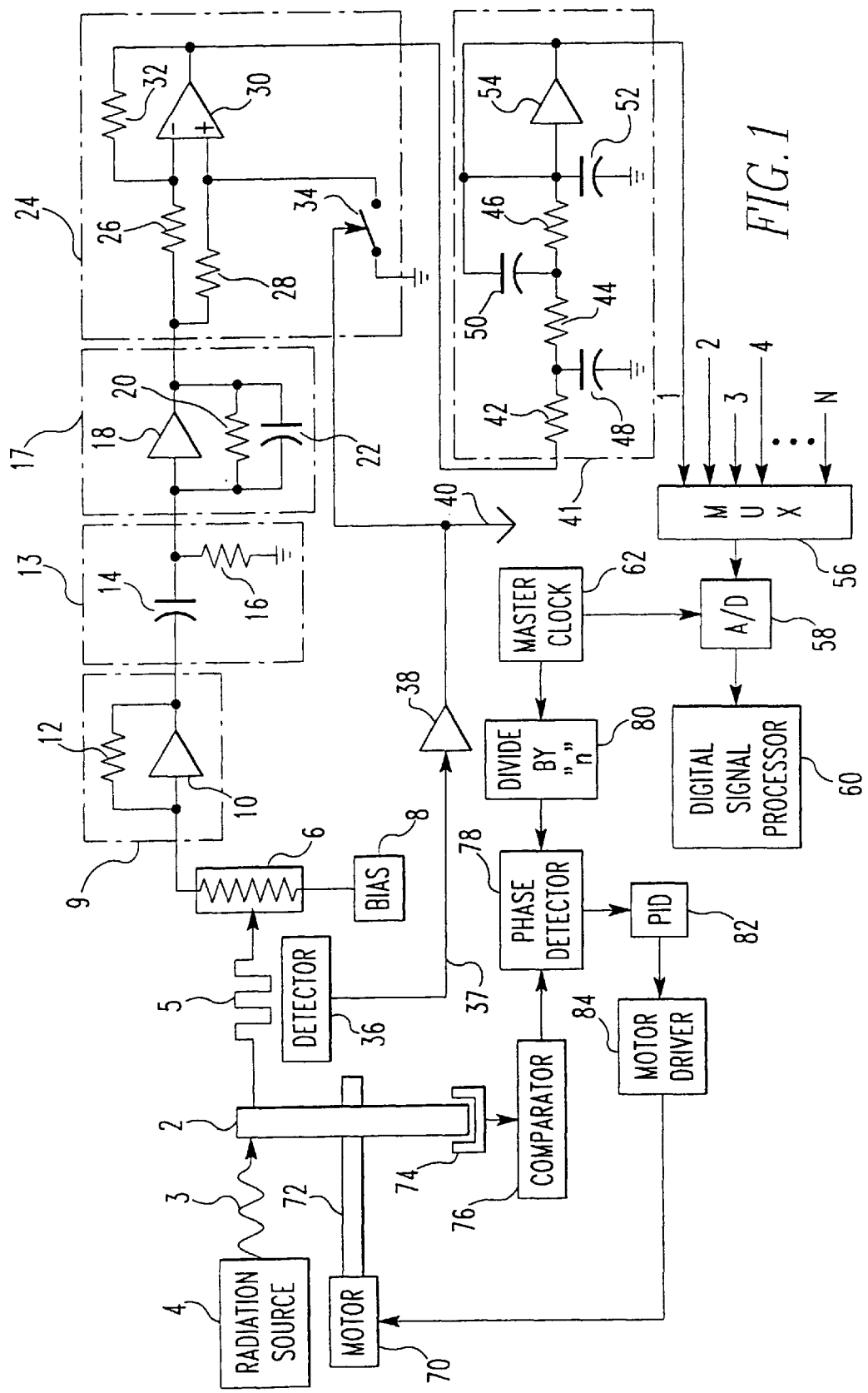
FIG. 1 is a schematic diagram of one embodiment of a radiation detection system in accordance with the present invention.

One embodiment of a radiation detection system in accordance with the present invention is shown in FIG. 1. An optical modulator, such as a rotating chopper wheel 2, is used to modulate the intensity of radiation from a radiation source 4 in a square wave or on-off manner. The radiation from the radiation source 4 and passing to the chopper wheel 2 is shown by reference number 3. The modulated radiation is shown by reference number 5. The modulated radiation 5 may pass through a human patient or other object (not shown) and is then supplied to a photoconductive detector 6 which, in a preferred embodiment, is included in an array of a plurality of similar photoconductive detectors. While only one photoconductive detector 6 is shown in FIG. 1, it is to be understood that a typical array will include a large number of such photoconductive detectors. One terminal of the photoconductive detector 6, referred to as the input terminal, is attached to a bias source 8, such as a DC voltage bias source. The electrical signal developed by the photoconductive detector 6 caused by radiation incident thereon is supplied from an output terminal to a preamplifier 9 formed of amplifier 10 and feedback resistor 12. The output of the preamplifier 9 is supplied through a high pass filter 13 formed of capacitor 14 and resistor 16 and to a first amplifier 17 formed of amplifier 18, resistor 20 and capacitor 22. The output of the first amplifier 17 is supplied to a second amplifier 24 whose operation will be discussed hereinafter in more detail. At the output of the high pass filter 13, the signal typically appears as a square wave with zero mean value. Typically, the positive part of the square wave corresponds to the period when the modulated radiation 5 is passed to the photoconductive detector 6, while the negative part of the square wave corresponds to the absence of light on the photoconductive detector 6, due to the blocking function of the chopper wheel 2. This AC signal generated by the photoconductive detector 6 is further amplified by preamplifier 9 and the first amplifier 17 and directed to the input of the second amplifier 24.

The output from the first amplifier 17 is supplied separately through parallel resistors 26 and 28 to the negative and positive input terminals, respectively, of operational amplifier 30. Resistor 32 extends between the output terminal of operational amplifier 30 and its negative terminal. A controllable switch 34 extends between the positive terminal of operational amplifier 30 and ground. Together, operational amplifier 30, resistors 26, 28 and 32, and switch 34 form the second amplifier 24.

A first phase detector 36, such as an optointerrupter, is associated with the chopper wheel 2 and is used to detect the phase of the modulated radiation 5 passing through the chopper wheel 2 and impinging on the photoconductive detector 6. A typical optointerrupter has an LED and detector on opposite sides of the chopper wheel 2 and aligned with the portion of the chopper wheel 2 performing the modulation of the radiation 3 from the radiation source 4. The first phase detector 36 supplies a reference or control signal 37, which can be amplified at amplifier 38, to the switch 34 in the second amplifier 24. As shown by arrow 40 in FIG. 1, the amplified reference signal 37 is also supplied to a switch 34 in each second amplifier 24 associated with the other photoconductive detectors 6 in the multi-detector array. When the transition of modulated radiation 5 occurs from "off" to "on", or from "on" to "off", the reference signal 37 causes the switch 34 to change its state from open to closed or vice versa. When switch 34 conducts or is closed, and considered to be in the "on" state, operational amplifier 30 is configured as an inverting amplifier with a gain of −1. When switch 34 is open or does not conduct, and considered in the "off" state, operational amplifier 30 has the same signal from the first amplifier 17 applied to both positive and negative input terminals. Since the positive input amplifies its signal with a gain of two, while the negative input terminal amplifies its signal with a gain of −1, the net output of operational amplifier 30 is equal to the sum of these two signals for a total amplifier gain equal to +1. In other words, switching the state of switch 34 between open and closed, as controlled by the reference signal 38 generated by the first phase detector 36, which detects the phase of the modulated radiation 5 to the photoconductive detector 6, causes the second amplifier 24 to switch between a non-inverting configuration to an inverting configuration and vice versa. This operation is equivalent to rectification of the signal.

This multiplier action, as enhanced by the high pass filter 13, forms a synchronous demodulator and effectively converts the AC signal generated by the photoconductive detector 6 into a DC voltage proportional to the modulated input radiation intensity. It should be noted, however, that only a signal to the second amplifier 24 which has the same phase and frequency as the modulated radiation 5 detected by the first phase detector 36, i.e., the reference signal 37, is converted to a DC voltage in the second amplifier 24. All other signal and noise components generated by the system and supplied to the second amplifier 24 are converted to an AC signal with a different frequency since at the output of the second amplifier 24 all signals are shifted in frequency by the value equal to the frequency of the reference signal 37 measured by the first phase detector 36. This operation facilitates further processing of the output signal from the second amplifier 24 by means of a low pass filter.

As shown in FIG. 1, the output of the second amplifier 24 is passed to a low pass filter 41 formed of resistors 42, 44, 46, capacitors 48, 50 and 52 and amplifier 54. In a preferred embodiment, the low pass filter 41 is a three pole active filter with a sixteen Hz corner frequency and sixty dB per decade roll off. The low pass filter 41 attenuates all frequencies with the exception of those that are within the DC to sixteen Hz bandwidth or other upper frequency cutoff as designed. The outputs of the various low pass filters 41 associated with each photoconductive detector 6 in an array are supplied to separate input terminals of a multiplexer 56 which performs time multiplexing for all of the channels supplied thereto. The output of the multiplexer 56 is buffered by an internal buffer amplifier and supplied to an analog-to-digital converter 58. The output of the analog-to-digital converter 58 is supplied, in a preferred embodiment, to a digital signal processor 60 where the collected digital data can undergo digital averaging or the like.

The sampling rate of the analog-to-digital converter 58 is developed from a master clock 62 by dividing some integer or whole number, which is eighty in one implementation of the invention. The sampling rate of the analog-to-digital converter 58, when divided by the number of sampled channels in the array of photoconductive detectors 6, produces a sampling rate per channel. The sampling rate per channel and the rate of rotation of the chopper wheel 2 are chosen in such a way as to allow for the existence of a rational number s/n, where s is an integer number of samples per channel and n is the number of rotations of the chopper wheel 2 for the same time.

Figure 2:
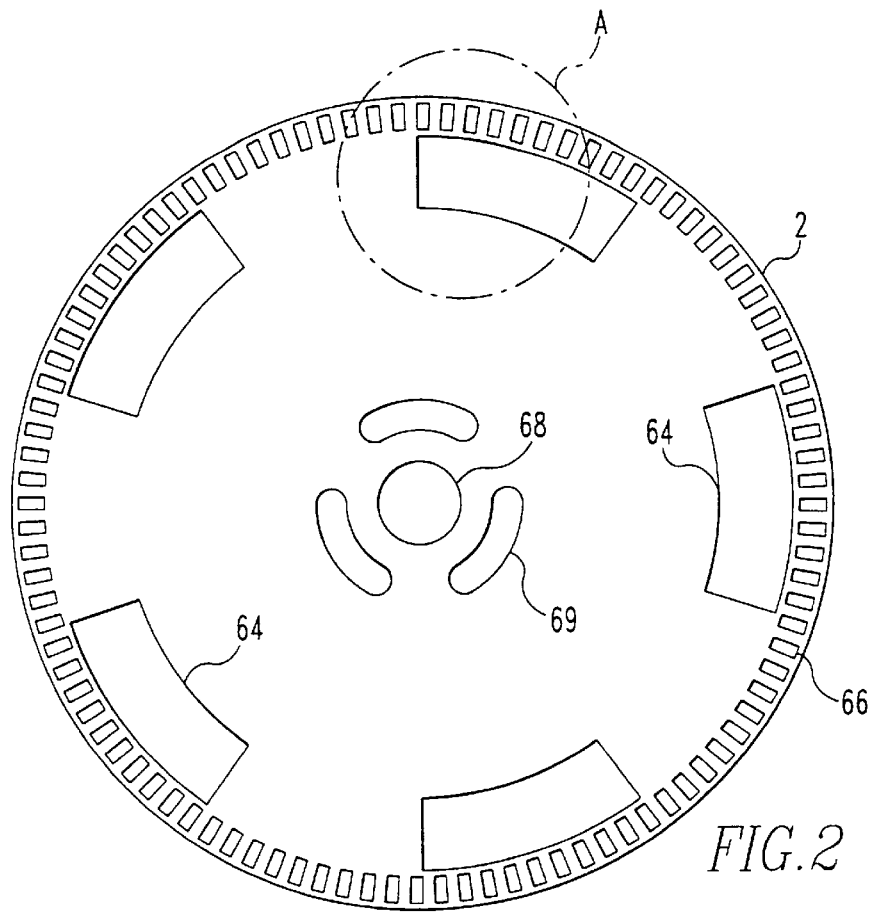
FIG. 2 is a plan view of one embodiment of a chopper wheel used in the system shown in FIG. 1.
Figure 2A:
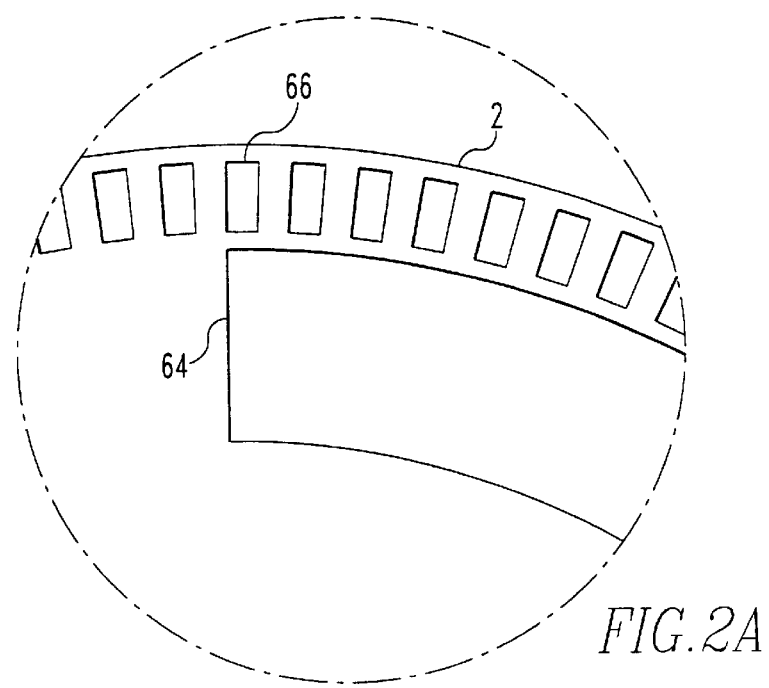
FIG. 2A is an enlarged view of area A shown in FIG. 2.
Figure 3:
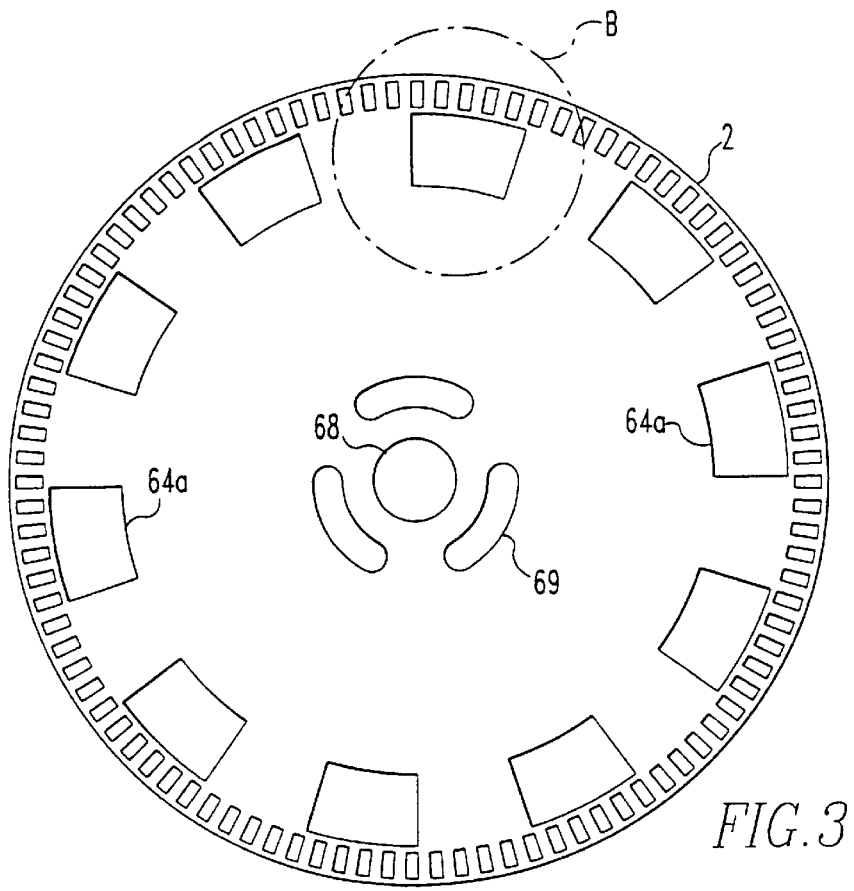
FIG. 3 is a plan view of a second embodiment of a chopper wheel used in the system shown in FIG. 1.
Figure 3A:
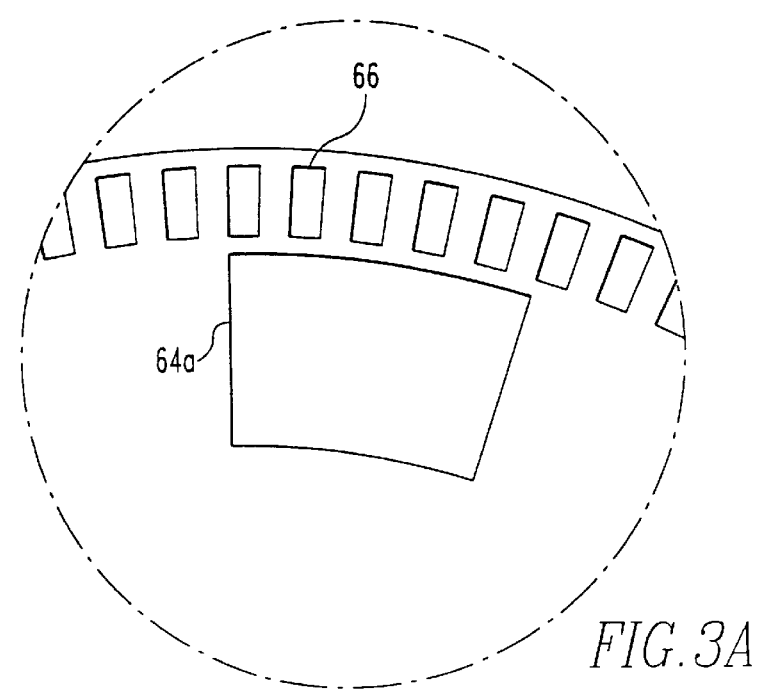
FIG. 3A is an enlarged view of area B shown in FIG. 3.

In one embodiment, the chopper wheel 2 is a slotted disk as shown in FIGS. 2 and 2A. The disk includes a number of evenly spaced and equally sized holes referred to as radiation beam chopping holes 64 to modulate the radiation 3 from the radiation source 4 and a larger number of smaller and evenly spaced holes, referred to as encoder holes 66, to detect the angular position or phase of the chopper wheel 2. FIGS. 2 and 2A show an arrangement which includes one hundred encoder holes 66 located along the outer peripheral edge of the chopper wheel 2 and five evenly spaced radiation beam chopping holes 64 located adjacent the encoder holes and inwardly toward the center thereof. The center of the chopper wheel 2 includes a shaft hole 68 surrounded by a number of mounting holes 69 for securely attaching the chopper wheel 2 to a motor shaft or other rotation mechanism. The first phase detector 36 will be associated with the radiation beam chopping holes 64 as these are the holes in the chopper wheel 2 which modulate the radiation 3 from the radiation source 4. FIGS. 3 and 3A show an alternate embodiment in which ten separate radiation beam chopping holes 64a and the same number of encoder holes 66 are included. It can be seen that the radiation beam chopping holes 64a in FIGS. 3 and 3A are half the angular length of the radiation beam chopping holes 64 shown in FIG. 2. In addition, an even number of encoder holes 66 are associated with each radiation beam chopping hole 64 or 64a. In the FIG. 2 embodiment, ten encoder holes 66 are associated with each radiation beam chopping hole 64. In the FIG. 3 embodiment, five encoder holes 66 are associated with each light beam chopping hole 64a.

With continued reference to FIG. 1, the chopper wheel 2 is preferably driven by a DC motor 70 having a shaft 72 attached thereto. A second phase detector 74, such as an optointerrupter, is used to detect the phase or speed or rotation of the chopper wheel 2. In a preferred embodiment, the second phase detector 74 carries its own radiation source, such as an LED, and a detector for making this measurement. The second phase detector 74 would be associated with the encoder holes 66 in the chopper wheel 2 shown in FIGS. 2 and 3. The on-off signal generated by the second phase detector 74 is passed to a comparator 76 which has its output connected to one input of phase detector 78. The other input of phase detector 78 is supplied with a reference frequency developed by a "divide by n" circuit 80 which receives a reference frequency from the master clock 62. The output of the phase detector 78 is proportional to the phase difference between the reference frequency of the master clock 62 and the frequency of the signal developed by the second phase detector 74, which is related to the speed of rotation of the chopper wheel 2. The output of phase detector 78 is supplied to the input of a PID (proportional integral derivative) controller 82 which amplifies this signal and corrects its phase. The output of the PID controller 82 is connected to a motor driver 84 which controls the operation of the motor 70 which is rotating the chopper wheel 2. By appropriately setting the "divide by n" circuit 80 and other elements, the rotation of the chopper wheel 2 can be precisely controlled.

Digital signal averaging included in the digital signal processor 60 in the present invention averages the value of many different data points for the various channels. The number of samples per given channel, which is used to calculate an average, is selected to be timewise equivalent to an integer number of the rotation of the chopper wheel 2. This results in a reduction of the chopper jitter and aliasing of the higher signal harmonics into a pass band, due to the properties of the averaging function. In this manner, digital averaging supplements the action of the second amplifier 24 and associated low pass filter 41 and improves the overall signal-to-noise ratio. In addition, the entire system is controlled by means of one master frequency in the master clock 62. All signals are locked to the frequency of the master clock 62, or a frequency created by integer division of the frequency of the master clock 62. Such an arrangement minimizes the ambiguity of phase between the controller for the chopper wheel 2, the second amplifier 24 and the analog-to-digital converter 58. The removal of this phase ambiguity greatly increases the achievable signal-to-noise ratio, by allowing almost perfect sampling of an integer number of cycles of the desired signal.

Having described above the presently preferred embodiments of the present invention, it is to be understood that the invention may be otherwise embodied within the scope of the appended claims.

We claim:

1. A radiation detector comprising at least one photoconductive detector, a modulator which modulates in an on-off manner radiation passing to said photoconductive detector from a radiation source, a bias source connected to one terminal of the photoconductive detector, a first amplifier connected to the other terminal of the photoconductive detector, a second amplifier which receives an output of the first amplifier, a first phase detector which monitors the phase of modulation of the radiation source by the modulator and generates a reference signal relating thereto, a switch means in said second amplifier which, in response to the reference signal generated by the first phase detector, changes the second amplifier between an inverting state and a non-inverting state as the modulator changes the phase of modulation of the radiation, an analog-to-digital converter which receives an output from the second amplifier, a second phase detector which monitors the operation of the modulator, a control means for controlling, in response to the second phase detector, the operation of the modulator, and a master clock which supplies a control frequency to the control means and to the analog-to-digital converter.

2. The radiation detector of claim 1 further including a low pass filter which receives an output signal from the second amplifier and supplies a filtered signal to the analog-to-digital converter.

3. The radiation detector of claim 1 further including a high pass filter which receives an output signal from the photoconductive detector and supplies a filtered signal to the first amplifier.

4. The radiation detector of claim 1 further including a plurality of photoconductive detectors each receiving radiation from the radiation source as modulated by the modulator, with the bias source connected to each photoconductive detector, and with each photoconductive detector having an associated first amplifier and second amplifier with switch means, with the first phase detector supplying the reference signal to and controlling the switch means in each second amplifier, with an output signal generated by each second amplifier supplied to a multiplexer, and with an output signal generated by the multiplexer supplied to the analog-to-digital converter.

5. The radiation detector of claim 4 further including a low pass filter associated with the output of each second amplifier and supplying a filtered signal to the multiplexer.

6. The radiation detector of claim 4 further including a high pass filter associated with the output of each photoconductive detector and supplying a filtered signal to the associated first amplifier.

7. The radiation detector of claim 4 further including a digital signal processor which receives an output signal from the analog-to-digital converter.

8. The radiation detector of claim 4 wherein the modulator is a chopper wheel having a plurality of evenly spaced radiation beam chopping holes which control the radiation supplied to the photoconductive detectors and wherein the first phase detector is a first optointerrupter associated with the radiation beam chopping holes.

9. The radiation detector of claim 8 wherein the reference signal generated by the first optointerrupter is amplified before it is supplied to the switch means associated with each of the second amplifiers.

10. The radiation detector of claim 8 wherein the chopper wheel includes a plurality of encoder holes evenly spaced along an outer peripheral edge thereof and wherein the second phase detector is a second optointerrupter associated with the encoder holes.

11. The radiation detector of claim 10 wherein the encoder holes are substantially smaller than the radiation beam chopping holes, wherein the chopper wheel includes substantially more encoder holes than radiation beam chopping holes and wherein the ratio of encoder holes to radiation beam chopping holes in the chopper wheel is a whole number.

12. The radiation detector of claim 11 wherein the chopper wheel includes at least ten times as many encoder holes as radiation beam chopping holes.

13. The radiation detector of claim 11 wherein the chopper wheel includes five radiation beam chopping holes and one hundred encoder holes.

14. The radiation detector of claim 11 wherein the chopper wheel includes ten radiation beam chopping holes and one hundred encoder holes.

* * * * *